United States Patent
Lozano et al.

(10) Patent No.: US 8,626,680 B2
(45) Date of Patent: Jan. 7, 2014

(54) GROUP VARIABLE SELECTION IN SPATIOTEMPORAL MODELING

(75) Inventors: Aurelie C. Lozano, Scarsdale, NY (US); Vikas Sindhwani, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/960,131

(22) Filed: Dec. 3, 2010

(65) Prior Publication Data

US 2012/0143796 A1 Jun. 7, 2012

(51) Int. Cl.
G06F 15/18 (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | |
|---|---|---|
| 8,145,745 B1 | 3/2012 | Ge et al. |
| 2007/0214097 A1 | 9/2007 | Parsons et al. |
| 2008/0228446 A1 | 9/2008 | Baraniuk et al. |
| 2010/0205138 A1 | 8/2010 | Zhang et al. |
| 2011/0028827 A1 | 2/2011 | Sitaram et al. |
| 2011/0055132 A1 | 3/2011 | Mahdian et al. |
| 2011/0112998 A1 | 5/2011 | Abe et al. |
| 2011/0131162 A1 | 6/2011 | Kaushal et al. |
| 2011/0167031 A1 | 7/2011 | Kleinberg et al. |
| 2012/0117059 A1 | 5/2012 | Bailey et al. |
| 2012/0262165 A1 | 10/2012 | Griswold et al. |
| 2012/0262166 A1 | 10/2012 | Griswold et al. |

OTHER PUBLICATIONS

Spatial-temporal Causal Modeling for Climate Change Attribution A. Lozano, H. Li, A. Niculescu-Mizil, Y. Liu, C. Perlich, J. Hosking, and N. Abe IBM T. J. Watson Research Center Yorktown Heights, NY 10598.*

Lozano, A. et al., "Block Variable Selection in Multivariate Regression and High-dimensional Causal Inference", Advanced Neural Information Processing Systems, pp. 1-9.

Lozano, A. et al., "Grouped Graphical Granger Modeling Methods for Temporal Causal Modeling", KDD'09, Jun. 28-Jul. 1, 2009, Paris, France, pp. 577-585.

Arnold A. et al., "Temporal Causal Modeling with Graphical Granger Methods", DDD'07 Aug. 12-15, 2007, San Jose, California, USA, pp. 66-75.

Agarwal, N. et al., "Identifying the Influential Bloggers in a Community" WSDM'08, Feb. 11-12, 2008, pp. 207-217.

Deshpande, G. et al., "Multivariate Granger Causality Analysis of fMRI Data", Human Brain Mapping, 30, pp. 1361-1373, 2009.

(Continued)

*Primary Examiner* — Kakali Chaki
*Assistant Examiner* — Ababacar Seck
(74) *Attorney, Agent, or Firm* — Scully, Scott, Murphy & Presser, P.C.; Daniel P. Morris, Esq.

(57) ABSTRACT

In response to issues of high dimensionality and sparsity in machine learning, it is proposed to use a multiple output regression modeling module that takes into account information on groups of related predictor features and groups of related regressions, both given as input, and outputs a regression model with selected feature groups. Optionally, the method can be employed as a component in methods of causal influence detection, which are applied on a time series training data set representing the time-evolving content generated by community members, output a model of causal relationships and a ranking of the members according to their influence.

25 Claims, 4 Drawing Sheets

SYSTEM DIAGRAM

(56) References Cited

OTHER PUBLICATIONS

Eiter, T. et al., "Complexity results for structure-based causality", Artificial Intelligence, 142, 2002, pp. 53-89.

Office Action dated Jan. 14, 2013 received in a related U.S. Appl. No. 12/960,106.

Argyriou et al., "Convex multi-task feature learning", Springer Science+Business Media, LLC (2008), pp. 243-272, Jan. 9, 2008.

Bedrick et al., "Model Selection for Multivariate Regression in Small Samples", Biometrics, Mar. 1994, p. 226.

Breiman et al., "Predicting Multivariate Responses in Multiple Linear Regression", Journal of the Royal Statistical Society, Series B (Methodological), vol. 59, No. 1 (1997), pp. 3-54; http://www.jstor.org/Tue May 24 10:43:34 2005.

Enders, "Applied Econometric Time Series", John Wiley & Sons, 2003.

Fletcher et al., "Orthogonal Matching Pursuit from Noisy Measurements: A New Analysis", NIPS, 2009, pp. 1-9.

Frank et al., "A Statistical View of Some Chemometrics Regression Tools", Technometrics, vol. 35, No. 2. p. 109, May 1993.

Friedman et al., "Sparse inverse covariance estimation with the graphical lasso", Biostatistics (2008), 9, 3, pp. 432-441, Advance Access publication on Dec. 12, 2007.

Fujikoshi et al., "Modified AIC and Cp in multivariate linear regression", Oxford Journals, Mathematics & Physical Sciences, Biometrika, vol. 84, Issue 3, pp. 707-716, Sep. 1, 1996.

Granger, "Testing for Causality", Journal of Economic Dynamics and Control 2 (1980) pp. 329-352, Jun. 1980.

Harville, "Matrix Algebra From a Statistician's Perspective", Springer, 1997.

Huang et al., "Learning with Structured Sparsity", Proceedings of the 26th Annual International Conference on Machine Learning, 2009, pp. 417-424.

Joachims, "Structured Output Prediction with Support Vector Machines", Springer-Verlag Berlin Heidelberg 2006, LNCS 4109, pp. 1-7.

Kleinberg, "Authoritative Sources in a Hyperlinked Environment", Proceedings of teh ACM-SIAM Symposium on Discrete Algorithms, 1998, and as IBM Research Report RJ 10076, May 1997.

Lozano et al., "Grouped graphical Granger modeling for gene expression regulatory networks discovery", vol. 25 ISMB 2009, pp. i110-i118, doi:10.1093/bioinformatics/btp199.

Lozano et al., "Group Orthogonal Matching Pursuit for Variable Selection and Prediction", Advances in Neural Information Processing Systems 22, 2009, pp. 1-9.

Mallat et al., "Matching Pursuit With time-Frequency Dictionaries", IEEE Transactions of Signal Processing, Dec. 1993, pp. 1-43.

Meinshausen et al., "High Dimensional Graphs and Variable Selection with the Lasso", The Annals of Statistics, AMS 2000, pp. 1-32.

Melville et al., "Social Media Analytics: Channeling the Power of Blogosphere for Marketing Insight", WIN 2009.

Micchelli et al., "Kernels for Multi-task Learning", In NIPS, 2004.

Obozinski et al., "Mutt-task feature selection", Technical Report, Jun. 2006, Department of Statistics, University of California, Berkeley, pp. 1-15.

Page et al., "The PageRank Citation Ranking: Bringing Order to the Web", Technical Report, Stanford Digital Libraries, Jan. 29, 1998, pp. 1-17.

Reinsel et al., "Lecture Notes in Statistics", Springer, Published Sep. 1998.

Ricci et al., "Magic Moments for Structured Output Prediction", Journal of Machine Learning Research, 9 (2008) Dec. 2008, pp. 2801-2846.

Tibshirani, :Regression Shrinkage and Selection via the Lasso, Journal of the Royal Statistical Society, Series B (Methodological), vol. 58, Issue 1 (1996), pp. 267-288., http://www.jstor.org/Sat Feb. 15 17:27:37 2003.

Tropp et al., "Algorithms for Simultaneous Sparse Approximation Part I: Greedy Pursuit", Sig. Proc., 86(3), pp. 572-588, 2006, Date: Typeset on Mar. 17, 2005.

Tsochantaridis et al., "Support Vector Machine Learning for Interdependent and Structured Output Spaces", Proceedings of the 21st International Conference on Machine Learning (ICML), pp. 104-112, 2004.

Turlach et al., "Simultaneous Variable Selection", School of Mathematics and Statistics (M019), University of Western Australia, CSIRO Mathematical and Information Sciences, Australia, Sep. 16, 2004.

Wasserman et al., "Social Network Analysis Methods and Applications", Cambridge Univ. Press, 1994.

Yuan et al., "Dimension reduction and coefficient estimation in multivariate linear regression", Journal of the Royal Statistical Society Series B, 60, Part 3, pp. 320-346, (2007).

Yuan et al., "Model selection and estimation in regression with grouped variables", Journal of the Royal Statistical Society Series B, 68, Part 1, pp. 49-67, (2006).

Zhang, "On the Consistency of Feature Selection using Greedy Least Squares Regression", Journal of Machine Learning Research 10 (2009) pp. 555-568, Mar. 2009.

Zhao et al., "Grouped and Hierarchical Model Selection through Composite Absolute Penalties", Department of Statistics, Univ. of California Berkeley, Apr. 17, 2006, pp. 1-36.

"Advection", Wikipedia, http://en.wikipedia.org/wiki/Advection, Nov. 30, 2010, pp. 1-4.

Arg max, http://en.wikipedia.org/wiki/Arg_max, Nov. 22, 2010, pp. 1-2.

"Causality", http://en.wikipedia.org/wiki/Causality, Nov. 22, 2010, pp. 1-17.

"Datasets", http://www.cs.cornell.edu/PROJECTS/KDDCUP/DATASETS.HTML, Sep. 4, 2003, pp. 1-2.

"Divergence theorem", http://en.wikipedia.org/wiki/Divergence_theorem, Nov. 22, 2010, pp. 1-5.

"Finite volume method", http://en.wikipedia.org/wiki/Finite_volume_method, Nov. 30, 2010, pp. 1-4.

"Granger causality", http://en.wikipedia.org/wiki/Granger_causality, Nov. 30, 2010, pp. 1-2.

"Greedy algorithm", http://en.wikipedia.org/wiki/Greedy_algorithm, Dec. 2, 2010, pp. 1-3.

"Lexical analysis", http://en.wikipedia.org/wiki/Lexical_analysis, Dec. 2, 2010, pp. 1-5.

"Likelihood function", http://en.wikipedia.org/wiki/Likelihood_function, Dec. 6, 2010, pp. 1-9.

"Linear least squares", http://en.wikipedia.org/wiki/Linear_least_squares, Dec. 2, 2010, pp. 1-13.

"Matrix norm", http://en.wikipedia.org/wiki/Matrix_norm, Dec. 2, 2010, pp. 1-5.

"Moore-Penrose pseudoinverse", http://en.wikipedia.org/wiki/Moore-Penrose_pseudoninverse, Dec. 2, 2010, pp. 1-8.

"Multivariate adaptive regression splines", http://en.wikipedia.org/wiki/Multivariate_adaptive_regression_splines, Dec. 2, 2010, pp. 1-8.

"Multivariate probit", http://en.wikipedia.org/wiki/Multivariate_probit, Dec. 2, 2010, p. 1.

"Non-negative matrix factorization", http://en.wikipedia.org/wiki/Non-negative_matrix_factorization, Dec. 2, 2010, pp. 1-6.

Phenomenology (science), http://en.wikipedia.org/wiki/Phenomenology_(science), Nov. 22, 2010, pp. 1-3.

"Regression analysis", http://en.wikipedia.org/wiki/Regression_analysis, Dec. 2, 2010, pp. 1-9.

Restriction (mathematics), http://en.wikipedia.org/wiki/Restrition_(mathematics), Dec. 6, 2010, p. 1.

"Source-sink dynamics", http://en.wikipedia.org/wiki/Source-sink_dynamics, Dec. 2, 2010, pp. 1-6.

"Sparse matrix", http://en.wikipedia.org/wiki/Sparse_matrix, Dec. 6, 2010, pp. 1-5.

"Stemming", http://en.wikipedia.org/wiki/Stemming, Dec. 2, 2010, pp. 1-9.

"Stop words", http://en.wikipedia.org/wiki/Stop_words, Dec. 2, 2010, p. 1.

(56) References Cited

OTHER PUBLICATIONS

"Taxicab geometry", http://en.wikipedia.org/wiki/Taxicab_geometry, Dec. 2, 2010, pp. 1-3.

Trace (linear algebra), http://en.wikipedia.org/wiki/Trace_(linear_algebra), Dec. 6, 2010, pp. 1-8.

"Vector autoregression", http://en.wikipedia.org/wiki/Vector_autoregression, Dec. 2, 2010, pp. 1-6.

"Web 2.0", http://en.wikipedia.org/wiki/Web_2.0, Dec. 2, 2010, pp. 1-10.

"Web crawler", http://en.wikipedia.org/wiki/Web_crawler, Dec. 2, 2010, pp. 1-12.

* cited by examiner

FIG. 1

SYSTEM DIAGRAM

SUBPROC1

INPUT:
- DATA MATRIX $X \in R^{n \times p}$, RESPONSE MATRIX $Y \in R^{K \times n}$
- SET OF SELECTED INPUT/OUTPUT GROUPS $M$, A K×K MATRIX $C$ 1. LET $O_M$ BE THE UNION OF OUTPUT GROUPS PRESENT IN $M$.
2. LET $\tilde{C} = C_{O_M, O_M} \otimes I_n$ AND $\tilde{Y} = vec(Y_{O_M})$.
3. FOR EACH OUTPUT GROUP $O_s$ IN $M$, LET $I_{O_s}$ BE THE UNION OF INPUT GROUPS IN $M$ THAT ARE PAIRED WITH $O_s$
4. LET $\tilde{X} = \text{diag}\{I_{|O_s|} \otimes X_{I_{O_s}}, O_s \subset O_M\}$
5. COMPUTE $\hat{\alpha} = (\tilde{X}^T \tilde{C} \tilde{X})^{-1} (\tilde{X}^T \tilde{C}) \tilde{Y}$,
6. LET $\hat{A}_X(M, Y)$ BE A p×K MATRIX SUCH THAT ENTRIES CORRESPONDING TO THE SUPPORT INDUCED BY $M$ ARE GIVEN BY $\hat{\alpha}$ AND THE OTHER ENTRIES ARE SET TO ZERO.

OUTPUT: RETURN $\hat{A}_X(M, Y)$

REARRANGING THE COLUMNS SO THAT WE HAVE BLOCKS

FIG. 8

DIFFERENT INPUT GROUPS FOR EACH OUTPUT GROUP

GROUP VARIABLE SELECTION IN SPATIOTEMPORAL MODELING

RELATED APPLICATION

The following application is filed concurrently with U.S. patent application Ser. No. 12/960,160; "INFERRING INFLUENCE AND AUTHORITY," Inventors A. C. Lozano & V. Sindhwani

BACKGROUND

The present disclosure generally relates to the use of regression in machine learning and data mining, and particularly to "variable selection" and in which constructs are based upon a training data set.

The broad goal of supervised learning is to effectively learn unknown functional dependencies between a set of input variables and a set of output variables, given a collection of training examples. The present application recognizes a potential synergism between two topics that arise in this context. The mention of these two topics here is made for the purpose of US law relating to information disclosure and does not constitute an admission that combination of any documents listed herein was known or obvious prior to such recognition by Applicants.

The first topic is Multivariate Regression Ildiko E. Frank and Jerome H. Friedman, "A statistical view of some chemometrics regression tools," Technometrics, 35(2):109-135, 1993; Leo Breiman and Jerome H Friedman, "Predicting multivariate responses in multiple linear regression,"Journal of the Royal Statistical Society: Series B, (1):1369-7412, 1997. Ming Yuan and Ali Ekici and Zhaosong Lu and Renato Monteiro, "Dimension reduction and coefficient estimation in multivariate linear regression", Journal Of The Royal Statistical Society Series B, 2007 which generalizes basic single-output regression to settings involving multiple output variables with potentially significant correlations between them. Applications of multivariate regression models include chemometrics, econometrics and computational biology.

Multivariate Regression may be viewed as a basis for many techniques in machine learning such as multi-task learning Charles A. Micchelli and Massimiliano Pontil, "Kernels for multi-task learning," NIPS, 2004; Andreas Argyriou, Theodoros Evgeniou, and Massimiliano Pontil, "Convex multi-task feature learning," Machine Learning, 73(3):243-272, 2008 and structured output prediction Elisa Ricci, Tijl De Bie, and Nello Cristianini, "Magic moments for structured output prediction, "Journal of Machine Learning Research, 9:2803-2846, December 2008; T. Joachims, "Structured output prediction with support vector machines." Joint IAPR International Workshops on Structural and Syntactic Pattern Recognition (SSPR) and Statistical Techniques in Pattern Recognition (SPR), pages 1-7, 2006; I. Tsochantaridis, T. Hofmann, T. Joachims, and Y. Altun. "Support vector machine learning for interdependent and structured output spaces," International Conference on Machine Learning (ICML), pages 104-112, 2004.

These techniques are output-centric in the sense that they attempt to exploit dependencies between output variables to jointly learn models that generalize better than those learned by treating outputs independently.

The second topic includes topics such as sparsity, variable selection and the broader notion of regularization. The view here is input-centric in the following specific sense. In very high dimensional problems, where the number of input variables may exceed the number of examples, the only hope for avoiding overfitting is via some form of "capacity control" over the family of dependencies being explored by the learning algorithm. This capacity control may be implemented in various ways, e.g., via dimensionality reduction, input variable selection or regularized risk minimization. Estimation of sparse models that are supported on a small set of input variables is a strand of research in machine learning. It encompasses 1-1 regularization (e.g., the lasso algorithm of R. Tibshirani, "Regression shrinkage and selection via the lasso," Journal of the Royal Statistical Society, Series B, 58:267-288, 1994 and matching pursuit techniques; S. Mallat and Z. Zhang, "Matching pursuits with time-frequency dictionaries," IEEE Transactions on Signal Processing, 1993 that come with theoretical guarantees on the recovery of the exact support under certain conditions. Particularly pertinent to this invention is the notion of structured sparsity. In many problems involving very high-dimensional datasets, the prior knowledge that the support of the model should be a union over domain-specific groups of features is enforced. Several methods have been recently proposed for this setting. For instance, M. Yuan and Y. Lin, "Model selection and estimation in regression with grouped variables," Journal of the Royal Statistical Society, Series B, 68:49-67, 2006 P. Zhao and G. Rocha and B. Yu, "Grouped and hierarchical model selection through composite absolute penalties" Technical report, 2006 extend the Lasso formulation to this context, while the methods of A. C. Lozano, G. Swirszcz, and N. Abe, "Grouped orthogonal matching pursuit for variable selection and prediction," Advances in Neural Information Processing Systems 22, 2009; J. Huang, T. Zhang, and D. Metaxas, "Learning with structured sparsity," Proceedings of the 26th Annual International Conference on Machine Learning, 2009 extend matching pursuit techniques.

The present disclosure treats very high dimensional problems involving a large number of output variables. It is desirable to address sparsity via input variable selection in multivariate linear models with regularization, since the number of parameters grows not only with the data dimensionality but also the number of outputs.

SUMMARY

The approach herein is guided by the following desiderata: (a) performing variable selection for each output in isolation may be highly suboptimal since the input variables which are relevant to (a subset of) the outputs may only exhibit weak correlation with each individual output. It is also desirable to leverage information on the relatedness between outputs, so as to guide the decision on the relevance of a certain input variable to a certain output, using additional evidence based on the relevance to related outputs; (b) It is desirable to take into account any grouping structure that may exist between input and output variables. Also, in the presence of noisy data, inclusion decisions made at the group level may be more robust than those at the individual variable level.

In one embodiment, a computer method includes carrying out operations on at least one data processing device, the operations including:
  maintaining a machine readable embodiment on a medium of data, the data being organized into at least one matrix data structure having a plurality of dimensions;
  imposing a group structure on the data, which group structure defines input and output blocks, at least one of the input and output blocks encompassing at least first and second data points in each of at least first and second dimensions;

performing multivariate regression in accordance with a coefficient matrix that is organized into coefficient blocks, the coefficient blocks linking the input and output blocks, the multivariate regression comprising, iteratively refining the coefficient blocks and selecting pertinent ones of the input and output blocks, responsive to results of such iteration;

presenting at least one user accessible machine representation of at least one conclusion about at least one relationship between the pertinent ones of the input and output blocks, responsive to the coefficient matrix.

In another embodiment, a system includes:

at least one storage device for embodying data and/or program code in a machine usable form;

at least one processor for performing operations in conjunction with the storage device, the operations being in accordance with the above method.

In another embodiment, a computer program product for identifying influence includes a storage medium readable by a processing circuit and storing instructions to be run by the processing circuit for performing the above method.

Objects and advantages will become apparent throughout the present disclosure and claims.

BRIEF DESCRIPTION OF THE DRAWINGS

Embodiments will now be described by way of non-limiting example with reference to the following figures.

In general, a data structure for use in group selection should meet certain requirements. In particular, the structure should allow for data having a given number of instances. For example, each instance might correspond to a different observation, e.g., a different point in time. Moreover, the data should be composed of a certain number of features to allow definition of a grouping structure over them.

DETAILED DESCRIPTION

As will be appreciated by one skilled in the art, aspects of the present invention may be embodied as a system, method or computer program product. Accordingly, aspects of the present invention may take the foam of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Herein, the terms "features" and "input variables" are synonymous and are interchangeable. Similarly, the terminology "multivariate regression," "multiple output regression," and "multiple response regression" are synonymous and may be used interchangeably. Also, the terms "output variable groups", "target groups", and "regression groups" mean the same and are interchangeable.

The term "spatiotemporal" is used to refer to a set of data that can be organized into a plurality of dimensions of a space, according to features of the data, and which varies over time.

The term "causal" herein means something less than "cause." Something may be "causal" if it is suspected of being a cause or behaves like a cause, even if it is not in fact the cause.

The term "originating community member" will be used herein to mean an entity associated with a set of content. For instance, a blogger or author can be an originating community member with respect to words or an element of a phenomenological system can be an originating community member with respect to gathered data. An originating community member can be considered causal with respect to another community member. When the originating community member is a causal person, that person can be regarded as an "authority".

The term "simultaneous" as used herein need not mean literally simultaneously. It means that a group of regressions are modeled together, using the same set of input variable groups as predictors for the group of regressions, and where the decision of whether to include or exclude input variable groups in the aforementioned set is made jointly for the whole regression group.

The term "jointly" as used herein means that the influence of all the bloggers on each other is assessed based on a joint consideration of all bloggers into a joint model, rather than performing isolated pair-wise tests between pairs of bloggers disregarding the presence and impact of other bloggers.

Methods and systems of variable selection in multivariate regression are set forth herein. These are particularly relevant for predictive and causal influence modeling applied to a chosen data set, e.g. in the area of Internet blogs or academic publications. Other fields of application include phenomenological systems, such as biological systems, where genes, population features, or ecosystem features can be viewed as authorities governing behavior of aspects of the system. The methods are given information on the grouping structure between input variables and on the grouping structure between the regressions, and use this information to guide the variable selection by imposing a sparsity structure on the estimated regression coefficients reflecting the grouping information. The method is also able to make use of additional information provided by an estimate of the error covariance matrix to further improve modeling accuracy.

The method may comprise a) "forward iterative variable block selection," namely iteratively selecting one of the input variable groups of interest and one of the regression groups of interest in each iteration based on by how much their introduction into the current model can reduce the residual loss; and b) in subsequent iterations making the variable block selection with respect to the reduction in residual loss of the estimated model when the input variable group and corresponding regression group in question are included into the model in addition to those groups that have been selected in earlier iterations; c) in which an arbitrary component regression method is allowed for performing the regression in each iteration.

In another aspect, the method may additionally include "iterative re-estimation" of the estimated coefficients of the current model, i.e., upon selection of the variable groups in each iteration the model coefficients are re-estimated, which may be performed, for example, using the least squares method.

A program storage device readable by a machine, tangibly embodying a program of instructions executable by the machine to perform above described methods may be also provided.

Further features as well as the structure and operation of various embodiments are described in detail below with reference to the accompanying drawings. In the drawings, like reference numbers indicate identical or functionally similar elements.

Figure 1:
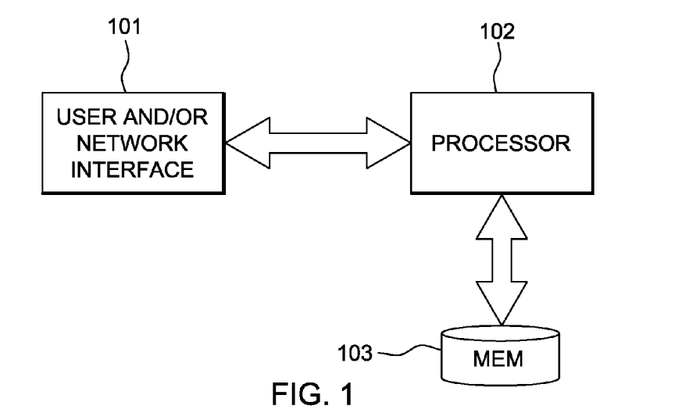
FIG. 1 is a block diagram of a system in which the invention may be implemented.

FIG. 1 shows a system in which the invention may be implemented. The system includes a user and or network interface 101, a processor 102, and a storage device 103. Elements depicted in this figure and elements depicted as distinct might be merged. The interface 101 inputs and outputs data and may be of any suitable type including wired and wireless connections, graphical user interfaces, keyboards, pointer devices, printers, etc. The processor 102 again may be of any suitable type including single and parallel processors and of diverse capabilities. The storage device 103 might be of any suitable type including magnetic, optical, solid state, read only, and read/write and may provide a physical embodiment of data and/or computer program code. Data on the storage device will include a set of observations on several features. Features might be words of a blog or, in phenomenological systems they might represent other measured quantities such as temperature or pressure are 2 features.

The present disclosure addresses the problem of variable selection for multivariate regression, where a natural grouping structure exists within the explanatory variables, a natural grouping structure also exists within the regressions, and it is desired to select the correct set of variable groups, rather than the individual variables. In this respect, the definitions of "simultaneous" and "joint," from the co-pending disclosure incorporated by reference above, will be pertinent.

The approach described herein will most likely be useful to very high dimensional problems involving a large number of output variables. Sparsity may be addressed via input variable selection in multivariate linear models. In such models regularization is desirable, since the number of parameters grows not only with the data dimensionality but also the number of outputs.

The present disclosure presents a greedy style algorithm in the category of matching pursuit procedures, which we call Multivariate Group Orthogonal Matching Pursuit} (MG-OMP), for enforcing arbitrary block sparsity patterns in multivariate regression coefficients. These patterns are specified by groups defined over both input and output variables.

In particular, MG-OMP can handle cases where the set of relevant features may differ from one response (group) to another, and is thus more general than simultaneous variable selection procedures (e.g. S-OMP of J. A. Tropp, A. C. Gilbert, and M. J. Strauss, "Algorithms for simultaneous sparse approximation: part i: Greedy pursuit," Sig. Proc., 86(3):572-588, 2006 as simultaneity of the selection is enforced within groups of related output variables rather than for the entire output. MG-OMP is more general than the Group-OMP (G-OMP) algorithm of A. C. Lozano, G. Swirszcz, and N. Abe, "Grouped orthogonal matching pursuit for variable selection and prediction," Advances in Neural Information Processing Systems 22, 2009 and applies to the case of multivariate regression.

Figure 2:
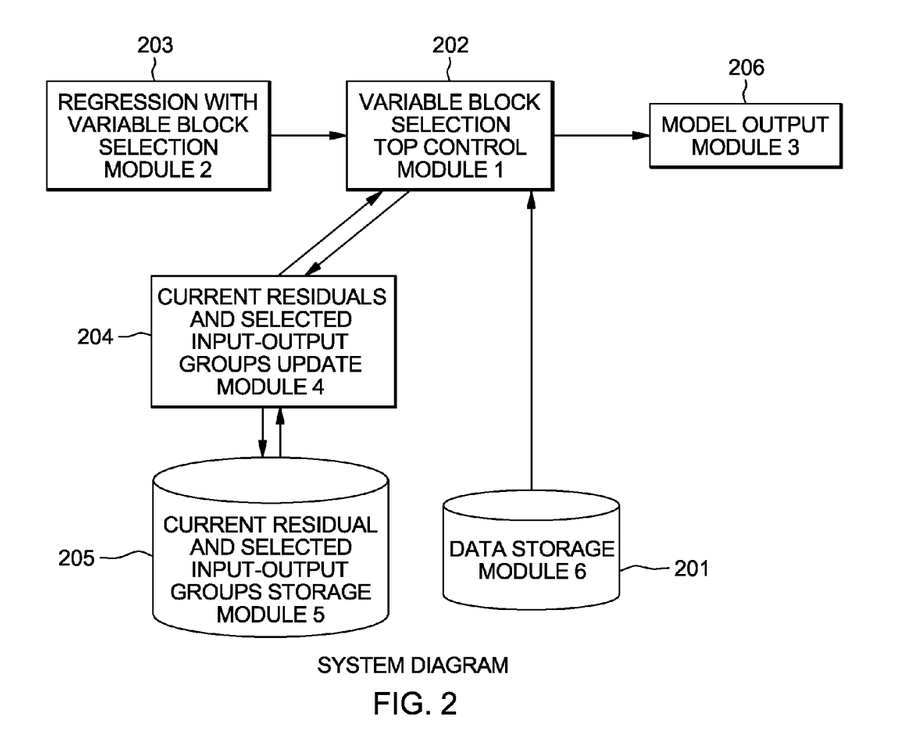
FIG. 2 depicts the block structure defined by the specification of input variable groups and output variable groups, namely the regression groups.

FIG. 2 shows a functional diagram of MG-OMP. More about the meaning of individual blocks in this diagram will be discussed below with reference to a more specific algorithmic presentation. While functions listed in this figure are presented in terms of modules, in fact the functions need not be so confined. Functions may be spread across more or less modules in accordance with the design parameters of the skilled artisan. Illustrated in FIG. 2 are: data storage module 6 (201); variable block selection top control module 1 (202); regression with variable block selection module 2 (203); current residuals and selected input-output groups update module 4 (204); current residual and selected input-output groups storage module 5 (205); and model output module 3 (206).

The following is the general form of the multivariate regression model, $$Y = X\overline{A} + E,$$

where $Y \in R^{n \times K}$ is the output matrix fanned by n training examples on K output variables, $X \in R^{n \times p}$ is the data matrix whose rows are p-dimensional feature vectors for the n training examples, $\overline{A}$ is the p×K matrix formed by the true regression coefficients, and E is the n×K error matrix. The row vectors of the error matrix E are assumed to be independently sampled from a multivariate Gaussian distribution $N(0, \Sigma)$ where $\Sigma$ is the K×K error covariance matrix. For simplicity of notation we assume without loss of generality that the columns of X and Y have been centered so it is not necessary to deal with intercept terms.

Centered means that the sample mean has been subtracted out of X. i.e.

$$X_{ij} \leftarrow \frac{X_{ij} - \left(\frac{1}{n}\sum_{k=1}^{n} X_{kj}\right)}{\left(\sum_{l=1}^{n}\left(X_{lj} - \left(\frac{1}{n}\sum_{k=1}^{n} X_{kj}\right)\right)^2\right)^{1/2}}$$

If X and Y are centered we model Y=XBeta. Otherwise, intercept tetras are added to the model, namely consider an additional vector Beta0, such that Y=Beta0+XBeta The negative log-likelihood function (up to a constant) corresponding to the aforementioned model can be expressed as $$-l(A,\Sigma) = tr((Y-XA)^T(Y-XA)\Sigma^{-1}) - n \log|\Sigma^{-1}|$$

where, A is any estimate of the true coefficient matrix $\overline{A}$ |·| denotes the determinant of a matrix and tr(·) denotes the trace function.

The maximum likelihood estimator is a matrix A that minimized the negative likelihood expression above. The maximizer of the likelihood is also the minimizer of the negative log likelihood. One possible maximum likelihood estimator of the coefficient matrix is the Ordinary Least Squares (OLS) estimator $\hat{A}^{OLS} = (X^TX)^{-1}X^TY$, which is equivalent to the concatenation of the OLS estimates for each of the K outputs taken separately, and thus does not depend on the covariance matrix $\Sigma$. This suggests that the OLS estimator may be suboptimal since it does not make use of the relatedness of the responses. In addition, it is well known that the OLS estimator performs poorly in the case of high dimensional predictor vectors and/or when the predictors are highly correlated. To alleviate these issues, it is desirable to reduce the number of parameters to be estimated. This can be accomplished via variable selection. Clearly, however, variable selection in multiple output regression is particularly challenging in the presence of high dimensional feature vectors as well as possibly a large number of responses.

Figure 4:
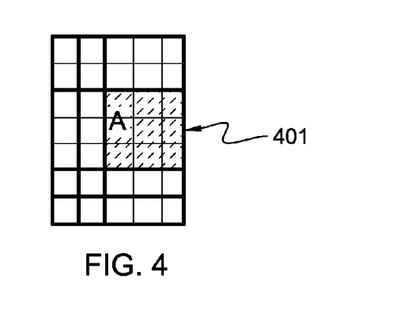
FIG. 4 is a conceptual diagram giving an intuitive illustration of selection of a first block for a solution matrix A in multivariate regression in a simplified, two dimensional example.
Figure 5:
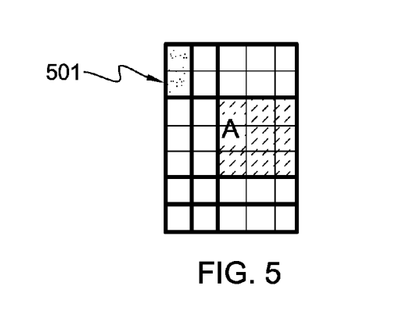
FIG. 5 is a conceptual diagram giving an intuitive illustration of selection of a second block for a solution matrix A in multivariate regression in a simplified, two dimensional example.
Figure 8:
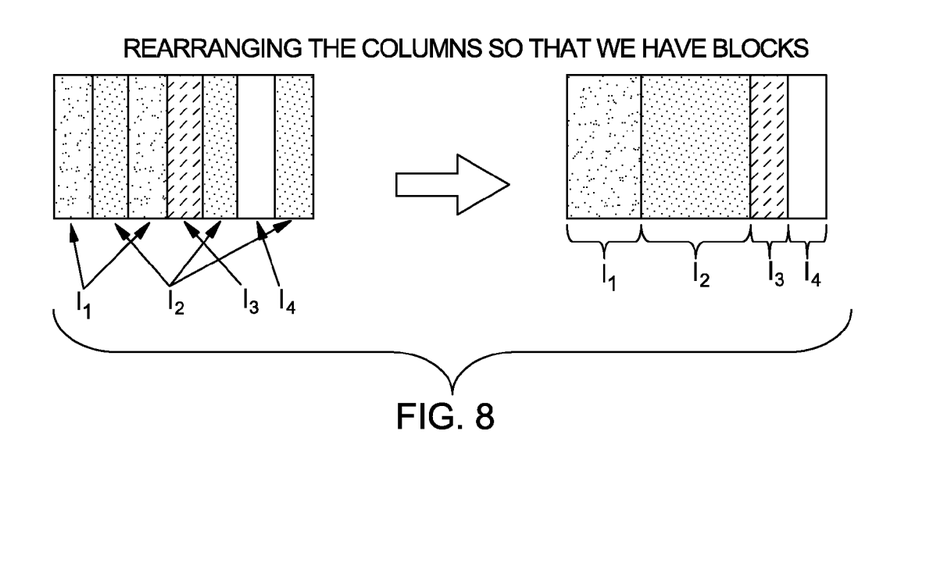
FIG. 8 shows rearranging blocks to make them contiguous.

In many applications, including high-dimensional time series analysis and causal modeling settings discussed below, it is possible to provide domain specific guidance for variable selection by imposing a sparsity structure on A. Let I= $\{I_1, \ldots I_L\}$ denote the set formed by L (possibly overlapping) groups of input variables where $I_k \subset \{1, \ldots p\}, k=1, \ldots, L$. Let $O = \{O_1, \ldots O_M\}$ denote the set formed by M (possibly overlapping) groups of output variables where $O_k \subset \{1, \ldots K\}, k=1, \ldots, M$. If certain variables do not belong to any group, they may be treated as groups of size 1. These group definitions specify a "block sparsity/support pattern" on A. Such blocks are illustrated in FIGS. 4 and 5 for the case of non-overlapping groups and where. Column indices may be permuted so that groups go over contiguous indices. An example of this is shown in FIG. 8 where blocks denoted $l_1, l_2, l_3$, and $l_4$ are rearranged to be contiguous.

A novel algorithm will now be outlined, "Multivariate Group Orthogonal Matching Pursuit", that attempts to minimize the negative log-likelihood associated with the multivariate regression model subject to the constraint that the support (set of non-zeros) of the regression coefficient matrix, A, is a union of blocks formed by input and output variable groupings. The algorithm can also deal with the more general case where there may be a different grouping structure for each output group, namely for each $O_k$, there could be a different set $I_{Ok}$, of input variable groups.

A more general view of variable grouping can be considered. One could envision that the output groups are individual bloggers, while the input groups could be defined over "cliques" of bloggers, and the clique configurations could be different depending on the output group. For instance, blogger B1 could be influenced by himself or bloggers B2&B3 or bloggers B4&B5, while blogger B2 could be influenced by bloggers B1&B4 or bloggers B3&B5 or himself . . . Etc.

Figure 9:
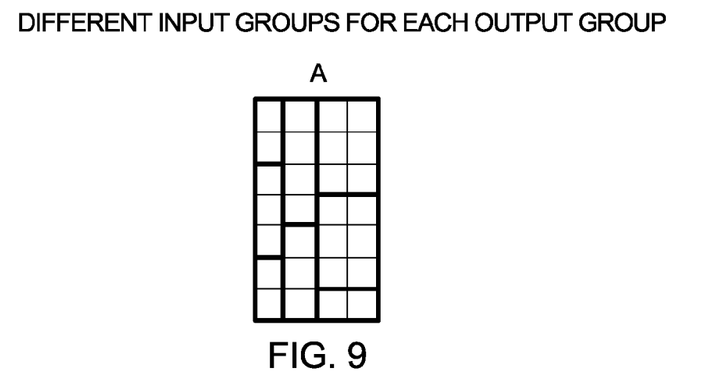
FIG. 9 shows more examples of variable groupings.

In FIG. 4 & FIG. 9, the output groups are defined over columns (separated by vertical lines). The input groups are defined over rows. In FIG. 4 the vertical tiling is the same across the entire matrix (reflecting the fact that the input groups are the same across all the output groups). In contrast, in FIG. 9, the vertical tiling depends on the output groups, so the composition for the input groups might differ from one output group to the next The Multivariate Group Orthogonal Matching Pursuit (MG-OMP) procedure performs greedy pursuit with respect to the loss function $$L_C(A,\Sigma)=tr((Y-XA)^T(Y-XA)C)$$

where C is an estimate of the precision matrix $\Sigma^{-1}$ given as input. Possible estimates include the sample estimate using residual error obtained from running univariate Group-OMP for each response individually. In addition to leveraging the grouping information via block sparsity constraints, the Multivariate Group Orthogonal Matching Pursuit procedure is able to incorporate additional information on the relatedness of the output variables which is implicitly encoded in the error covariance matrix, noting that the latter is also the covariance matrix of the response Y conditioned on the predictor matrix X. Existing variable selection methods often ignore this information and deal instead with (regularized versions of) the simplified objective $tr((Y-XA)^T(Y-XA))$ thereby implicitly assuming that $\Sigma$ is the identity matrix.

Some additional notation will now be set forth. For any set of output variables $O \subset \{1, \ldots K\}$, $C_O$ will denote the restriction of the K×K precision matrix C to columns corresponding to the output variables in O, while $C_{O,O}$ denotes similar restriction to both columns and rows. For any set of input variables $I \subset \{1, \ldots p\}$, $X_I$ will denote the restriction of X to columns corresponding to the input variables in I. Furthermore, to simplify the exposition, it will be assumed in the remainder that, for each group of input variables $I_s$ in I, $X_{I_s}$ is orthonormalized, i.e., $X_{I_s}^T X_{I_s}$=Identity. In the mth iteration of the procedure, $A^{(m-1)}$ will denote the latest estimate of the regression coefficient matrix and $R^{(m-1)}$ the corresponding matrix of residuals, i.e., $R^{(m-1)}=Y-XA^{(m-1)}$.

Figure 3:
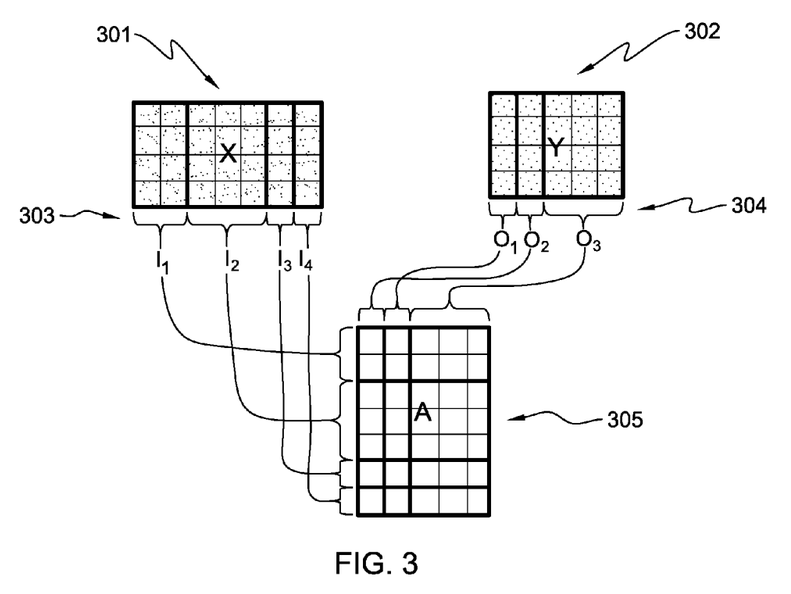
FIG. 3 is a conceptual diagram giving an intuitive illustration of block selection in a simplified, two dimensional example.

The MG-OMP algorithm is shown schematically in FIG. 2 and textually below. FIGS. 3-5 also illustrate points with respect to the algorithm below INPUT (201)
The data $X \in \mathbf{R}^{n \times p}$ (301)
The response matrix $Y \in \mathbf{R}^{K \times n}$. (302)
The input and output group structures $\mathcal{I} = \{I_r, r=1, \ldots, L\}$ and $\mathcal{O} = \{O_s, s=1, \ldots, M\}$. (303, 304, respectively)
An estimate of the K×K error precision matrix $C = \hat{\Sigma}^{-1}$
Precision $\epsilon > 0$ for the stopping criterion
INITIALIZATION (202, VARIABLE BLOCK SELECTION)
Initialization: $\mathcal{M}^{(0)}=\emptyset$, $A^{(0)}=0$.
FOR m=1
Compute current residual error matrix $$R^{(0)}=Y$$

Pick the block that helps most in term of reducing the residual error (203, Regression with variable block selection; 401 of FIG. 4)

Let $(r^{(m)},s^{(m)})=\arg\max_{r,s} tr((X_{I_r}^T \mathbf{R}^{(m-1)} C_{O_s})^T (X_{I_r}^T \mathbf{R}^{(m-1)} C_{O_s})(C_{O_s,O_s}^{-1}))$.

If the benefit gained by incorporating this block is too small, stop

If $tr((X_{I_r}^T \mathbf{R}^{(m-1)} C_{O_s})^T (X_{I_r}^T \mathbf{R}^{(m-1)} C_{O_s})(C_{O_s,O_s}^{-1})) \le \epsilon$) break Else: include this block into the set of selected blocks (colored blocks of A) (storage of prior generation of M is at 204 and 205. Current Residuals and selected input-output groups Update; output of current generation of M is at 206 Model Output)

Figure 6:
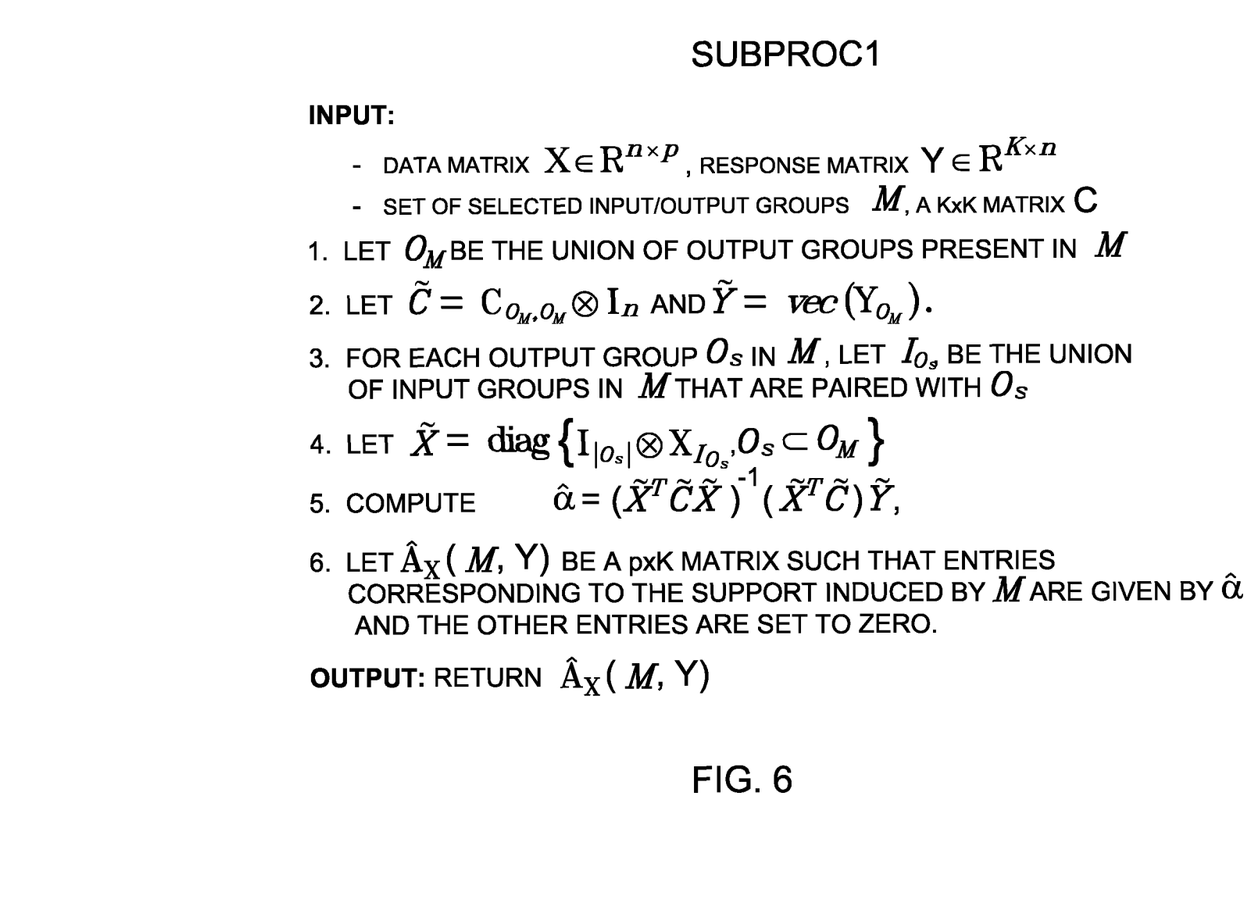
FIG. 6 is an algorithmic style presentation of a sub-procedure relating to identification of solution matrix A.

Set $\mathcal{M}^{(m)} = \mathcal{M}^{(m-1)} \cup (I_r(m), O_k(m))$ and compute the least square solution using all the updated set of selected bocks (Model output 206)
$A^{(m)} = \hat{A}_X(\mathcal{M}^{(m)}, Y)$.
where $\hat{A}_X(\mathcal{M}^{(m)}, Y)$ is returned by the subprocedure "SUBPROC1" called with X,Y,C and $\mathcal{M}^{(m)}$ as inputs per FIG. 6

For m=2
Compute current residual error matrix:

$$\mathbf{R}^{(m-1)}=Y-XA^{(m-1)}$$

Pick the block that helps most in term of reducing the residual error (501)

Let $(r^{(m)},s^{(m)})=\arg\max_{r,s} tr((X_{I_r}^T \mathbf{R}^{(m-1)} C_{O_s})^T (X_{I_r}^T \mathbf{R}^{(m-1)} C_{O_s})(C_{O_s,O_s}^{-1}))$.

If benefit gained by incorporating this block is too small stop:

If $tr((X_{I_r}^T \mathbf{R}^{(m-1)} C_{O_s})^T (X_{I_r}^T \mathbf{R}^{(m-1)} C_{O_s})(C_{O_s,O_s}^{-1})) \le \epsilon$) break Else: include this block in the set of selected blocks (401)
Set $\mathcal{M}^{(m)} = \mathcal{M}^{(m-1)} \cup (I_r(m), O_k(m))$ and compute the least square solution using all the updated set of selected bocks
$A^{(m)} = \hat{A}_X(\mathcal{M}^{(m)}, Y)$.

where $\hat{A}_X(\mathcal{M}^{(m)}, Y)$ is returned by the subprocedure "SUBPROC1" called with X,Y,C and $\mathcal{M}^{(m)}$ as inputs per FIG. 6

Figure 7:
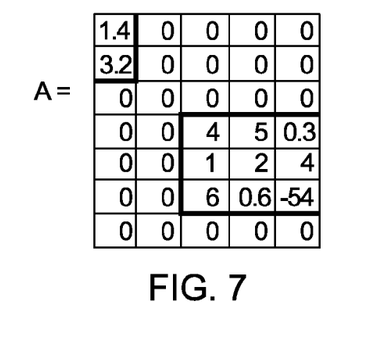
FIG. 7 is a matrix visualization showing a simplified example of a sparse matrix A including the blocks identified in FIGS. 5 and 6.

Output: The selected group pairs $\mathcal{M}^{(m)}$ and the regression coefficient matrix $A^{(m)} \in \mathbf{R}^{n \times K}$. For instance, with respect to FIGS. 3-5, one might get the output $\mathcal{M}^{(2)} = \{(I_2, O_3), (I_1, O_1)\}$ and A as shown in FIG. 7.

Script and Italic manuscript letters "M" are used interchangeably herein. The regression coefficient matrix is then re-estimated as $$A^{(m)} = \hat{A}_X(\mathcal{M}^{(m)}, Y), \text{ where} \quad \text{Eq. 1}$$

$$\hat{A}_X(\mathcal{M}^{(m)}, Y) = \arg\min_{A \in R^{p \times K}} L_C(A)$$

subject to $supp(A) \subset \mathcal{M}(m)$.

More detail about the operation of the subprocedure of FIG. 6 will now be presented. A closed form solution for the equation Eq1 will now be given. Since there are features which are only relevant to a subset of the responses, the covariance matrix C comes into play and the problem can not be decoupled, in contrast to the standard OLS solution. However, a closed form solution can be derived by recalling the following matrix identities (see D. Harville, "Matrix Algebra from a Statistician's Perspective," Springer, 1997.

$$tr(M_1^T M_2 M_3 M_4^T) = vec(M_1)^T (M_4 \otimes M_2) vec(M_3), \quad \text{Eq.2}$$

$$vec(M_1 M_2) = (I \otimes M_1) vec(M_2), \quad \text{Eq.3}$$

where vec denotes the matrix vectorization, $\otimes$ the Kronecker product, and the dimensions of the identity matrix I equal the number of rows of $M_2$. From equation Eq.2, we have $$tr((Y-XA)^T(Y-XA)C) = (vec(Y-XA))^T (C \otimes I_n)(vec(Y-XA)). \quad \text{Eq.4}$$

For a set of selected blocks, say M, let $O_M$ be the union of the output groups present in M i.e., $O_M = \cup_{s: \exists r \text{ such that}(I_r, O_s) \in M} O_s$. Then, let $\tilde{C} = C_{O_M, O_M} \otimes I_n$ and $\tilde{Y}=\text{vec}(Y_{O_M})$. For each output group $O_s$ present in M, let $I_{O_s}=\cup_{r:(I_r,O_s)\in M}I_r$. Finally define $\tilde{X}$ such that $\tilde{X}=\text{diag}\{I_{|O_s|}\otimes X_{I_{Q_s}}, O_s\subset O_M\}$.

Using equations Eq.4 and Eq.3 one can show that the non-zero entries of $\text{vec}(\hat{A}_\mathcal{M}(\mathcal{M},Y))$, i.e., those corresponding to the support induced by M, are given by:

$$\hat{\alpha}=(\tilde{X}^T\tilde{C}\tilde{X})^{-1}(\tilde{X}^T\tilde{C})\tilde{Y},$$

which thus provides a closed-form formula for the coefficient re-estimation step.

To conclude the description of the MG-OMP algorithm, one could also consider performing alternate optimization of the original negative log-likelihood objective over A and Σ, using MG-OMP to optimize over A for a fixed estimate of Σ, and using a covariance estimation algorithm (e.g. Graphical Lasso J. Friedman, T. Hastie, and R. Tibshirani, "Sparse inverse covariance estimation with the graphical lasso," Biostatistics, 9(3):432-441, July 2008), to estimate Σ with fixed A.

In the context of blogs, the input and output groups usually coincide; but they need not. For instance, one could consider focusing on how bloggers within a certain community influence bloggers from another community. Say the set of blogger in the imput are physicists and the set of blogger in the output are biologists.

Discussion of Related Work

Several methods have been proposed recently to address the variable group selection problem in univariate regression, based on the minimization of an empirical error penalized by a regularization term. These methods extend the Lasso formulation (see R. Tibshirani, "Regression shrinkage and selection via the lasso," Journal of the Royal Statistical Society, Series B, 58:267-288, 1994.) by modifying the 1-1 penalty to account for the group structure. Specifically, M. Yuan and Y. Lin, "Model selection and estimation in regression with grouped variables," Journal of the Royal Statistical Society, Series B, 68:49-67, 2006 proposed the Group Lasso, which employs the so-called 1-1/1-2 penalty, i.e., the sum of the 1-2 norms of the model restrictions to each variable group, so as to enforce sparsity at the variable group level. Group lasso methods have been applied to simultaneous individual variable selection in the context of multivariate regression B A. Turlach and W. N. Venables and S. J. Wright,"Simultaneous variable selection", Technometrics, 2005 In view of the results by T. Zhang, "On the consistency of feature selection using greedy least squares regression," Journal of Machine Learning Research, 2008; A. Fletcher and S. Rangan, "Orthogonal Matching Pursuit From Noisy Random Measurements: A New Analysis", NIPS, 2009. A. C. Lozano, G. Swirszcz, and N. Abe, "Grouped orthogonal matching pursuit for variable selection and prediction," Advances in Neural Information Processing Systems 22, 2009, OMP-based methods compare favorably to Lasso-based methods both in term of variable selection and prediction accuracy.

Furthermore, the proposed MG-OMP procedure is much more flexible than existing methods, in terms of handling various sparsity patterns with respect to both input and output variables. For instance it is more general than simultaneous variable selection procedures (e.g. S-OMP of J. A. Tropp, A. C. Gilbert, and M. J. Strauss, "Algorithms for simultaneous sparse approximation: part i: Greedy pursuit," Sig. Proc., 86(3):572-588, 2006), while generalizing variable group selection methods J. Huang, T. Zhang, and D. Metaxas D., "Learning with structured sparsity," Proceedings of the 26th Annual International Conference on Machine Learning, 2009; A. C. Lozano, G. Swirszcz, and N. Abe, "Grouped orthogonal matching pursuit for variable selection and prediction". Advances in Neural Information Processing Systems 22, 2009 to multivariate regression.

In addition, MG-OMP is especially attractive due to its computational efficiency, and also since the algorithm can be parallelized in a very efficient manner. Such points are crucial when dealing with large datasets, which is increasingly the case in many applications of machine learning and data mining.

Other approaches have been proposed for multivariate regression that differ from variable selection. G. Reinsel and R. Velu, "Multivariate Reduced-rank Regression: Theory and Applications,", Springer New York, 1998 enforce dimension reduction by constraining the rank of the regression coefficient matrix. Y. Fujikoshi and K. Satoh,"Modified AIC and Cp in multivariate linear regression", Biometrika, 1997; E. Bedrick and C. Tsai, "Model selection for multivariate regression in small samples", Biometrics, 1994; consider criterion-based model selection. The FES method of Ming Yuan and Ali Ekici and Zhaosong Lu and Renato Monteiro, "Dimension reduction and coefficient estimation in multivariate linear regression", Journal Of The Royal Statistical Society Series B, 2007 solves $$\text{argmin}\, tr((Y-XA)^T(Y-XA))$$
$$\text{subject to }\sum_{i=1}^{\min(p,K)}\sigma_i(A)\le t,$$

where $\sigma_i(A)$ is the ith largest singular value of A, and ignoring the error covariance matrix. This approach also leads to rank-reduction.

Experimental Evaluation

An empirical evaluation of the method proposed herein was undertaken in comparison with representative variable selection methods, in terms of accuracy of prediction and variable (group) selection. The F1 measure of variable selection accuracy will be used, this being defined as $F1=\{2PR\}/\{P+R\}$, where P denotes the precision and R denotes the recall. As measure of prediction accuracy, either the model error defined as $ME(\hat{A},A)=tr((\hat{A}-A)^TE(X^TX)(\hat{A}-A))$, when available, or otherwise the average squared error on a test set.

For all the greedy pursuit methods, "holdout validated" estimates are applied, namely the iteration number (i.e. stopping point) that minimize the average squared error on a validation set is selected. For univariate methods, two cases: are considered (i) individual selection of the iteration number for each univariate regression that minimize the average squared error w.r.t to the univariate regression considered, (ii) joint selection of the same iteration number for each univariate regression that minimize the sum of the averaged squared error over the K univariate regressions. For each setting, there were 50 runs, each with 50 observations for training, 50 for validation and 50 for testing.

Experiment 1: Feature/Response groups of size one. The purpose of this experiment was to evaluate the benefits of using the method described herein, as the strength of the correlation between the responses is varied, in the simple case where both response groups and feature groups are also of size one (i.e, each feature/response is a group). There should be independent sparsity patterns for each individual regression. there is an n×p predictor matrix X, where the rows are generated independently according to a multivariate Gaussian distribution $N_p(0,S)$, with $S_{i,j}=0.7^{|i-j|}$. The n×K error matrix E is generated according to $N_K(0,\Sigma)$, with $\Sigma_{i,j}=\rho^{|i-j|}$, where $\rho\in\{0,0.5,0.7,0.9\}$. The true coefficient matrix A was generated as follows. First the sparsity pattern was generated, namely the entries of A were first set to be zero or non-zero by drawing independent samples from a Bernoulli distribution with probability $P_s$. Then for each non-zero entry of A, independently, the value was set according to the normal distribution N(0,1). Various combinations for the values of (p, K, ρ, $P_s$) were considered.

MG-OMP was compared with C estimated from univariate OMP fits (denoted as "MG-OMP (C)"); MG-OMP with C set to identity (denoted as "MG-OMP (Id)"); OMP with individual and joint iteration number selection ("OMP (ind)" and "OMP (joint)"); and OLS. The results are presented in Table 1 below.

notational irregularity such that $X^q$ denotes the matrix such that $X_{i,j}^q = (X_{i,j})^q$. X and E were generated as in Experiment 1. $A_1, A_2, A_3$ had a common sparsity pattern, setup as in Experiment 1 with $P_s=0.1$. Then for each non-zero entry of the $A_i$'s, the value was set independently according to N(0,1). The number of features for X, i.e., p, was set to 20. Hence we consider 60 variables grouped into 20 groups corresponding the 3rd degree polynomial expansion.

Comparison was made between (i) MG-OMP with correct feature groups and C estimated from univariate OMP fits (denoted as "MG-OMP(C)"); (ii) MG-OMP with correct feature groups and C set to identity (denoted as "MG-OMP}(Id)"); (iii) MG-OMP

TABLE 1

Average $F_1$ score (top) and model error (bottom) for the models output by variants of MG-OMP, Univariate OMP and Ordinary Least Squares, under the setting of Experiment 1.

| p | K | ρ | $P_s$ | MG-OMP (C) | MG-OMP (Id) | OMP (ind) | OMP (joint) | OLS |
|---|---|---|---|---|---|---|---|---|
| 20 | 20 | 0.9 | 0.1 | 0.827 ± 0.009 | 0.726 ± 0.008 | 0.689 ± 0.009 | 0.611 ± 0.007 | 0.2611 ± 0.003 |
| 20 | 20 | 0.7 | 0.1 | 0.775 ± 0.006 | 0.723 ± 0.007 | 0.678 ± 0.007 | 0.607 ± 0.007 | 0.258 ± 0.003 |
| 20 | 20 | 0.5 | 0.1 | 0.744 ± 0.007 | 0.715 ± 0.007 | 0.679 ± 0.007 | 0.609 ± 0.007 | 0.257 ± 0.003 |
| 20 | 20 | 0 | 0.1 | 0.710 ± 0.006 | 0.717 ± 0.008 | 0.683 ± 0.0073 | 0.605 ± 0.007 | 0.260 ± 0.003 |
| 20 | 20 | 0.9 | 0.5 | 0.804 ± 0.003 | 0.764 ± 0.005 | 0.767 ± 0.003 | 0.746 ± 0.003 | 0.706 ± 0.003 |
| 20 | 20 | 0.7 | 0.5 | 0.786 ± 0.003 | 0.768 ± 0.003 | 0.770 ± 0.003 | 0.748 ± 0.003 | 0.713 ± 0.002 |
| 20 | 20 | 0.5 | 0.5 | 0.771 ± 0.003 | 0.768 ± 0.003 | 0.769 ± 0.003 | 0.747 ± 0.003 | 0.708 ± 0.002 |
| 20 | 20 | 0 | 0.5 | 0.758 ± 0.003 | 0.760 ± 0.003 | 0.768 ± 0.003 | 0.746 ± 0.003 | 0.706 ± 0.003 |
| 20 | 60 | 0.9 | 0.1 | 0.833 ± 0.004 | 0.717 ± 0.004 | 0.687 ± 0.005 | 0.609 ± 0.004 | 0.260 ± 0.002 |
| 20 | 60 | 0.7 | 0.1 | 0.782 ± 0.003 | 0.716 ± 0.004 | 0.688 ± 0.004 | 0.609 ± 0.004 | 0.261 ± 0.002 |
| 20 | 60 | 0.5 | 0.1 | 0.751 ± 0.004 | 0.713 ± 0.006 | 0.695 ± 0.004 | 0.605 ± 0.005 | 0.263 ± 0.002 |
| 20 | 60 | 0 | 0.1 | 0.714 ± 0.004 | 0.712 ± 0.004 | 0.684 ± 0.003 | 0.601 ± 0.004 | 0.260 ± 0.002 |
| 60 | 20 | 0.9 | 0.1 | 0.777 ± 0.006 | 0.647 ± 0.007 | 0.619 ± 0.005 | 0.593 ± 0.005 | NA |
| 60 | 20 | 0.7 | 0.1 | 0.705 ± 0.005 | 0.643 ± 0.005 | 0.615 ± 0.005 | 0.591 ± 0.006 | NA |
| 60 | 20 | 0.5 | 0.1 | 0.670 ± 0.004 | 0.658 ± 0.005 | 0.625 ± 0.004 | 0.601 ± 0.004 | NA |
| 60 | 20 | 0 | 0.1 | 0.648 ± 0.006 | 0.647 ± 0.005 | 0.619 ± 0.004 | 0.592 ± 0.005 | NA |

| p | K | ρ | $P_s$ | MG-OMP | MG-OMP (Id) | OMP (ind) | OMP (joint) | OLS |
|---|---|---|---|---|---|---|---|---|
| 20 | 20 | 0.9 | 0.1 | 0.626 ± 0.043 | 3.305 ± 0.134 | 3.470 ± 0.173 | 5.105 ± 0.198 | 14.241 ± 0.511 |
| 20 | 20 | 0.7 | 0.1 | 1.655 ± 0.082 | 3.331 ± 0.133 | 3.450 ± 0.113 | 5.087 ± 0.192 | 14.299 ± 0.320 |
| 20 | 20 | 0.5 | 0.1 | 2.529 ± 0.109 | 3.401 ± 0.158 | 3.507 ± 0.116 | 5.119 ± 0.165 | 14.032 ± 0.246 |
| 20 | 20 | 0 | 0.1 | 3.460 ± 0.119 | 3.292 ± 0.123 | 3.402 ± 0.089 | 5.063 ± 0.125 | 13.731 ± 0.203 |
| 20 | 20 | 0.9 | 0.5 | 4.660 ± 0.166 | 9.906 ± 0.305 | 8.655 ± 0.279 | 11.195 ± 0.388 | 13.132 ± 0.546 |
| 20 | 20 | 0.7 | 0.5 | 8.101 ± 0.195 | 10.551 ± 0.254 | 9.151 ± 0.253 | 12.165 ± 0.328 | 13.893 ± 0.385 |
| 20 | 20 | 0.5 | 0.5 | 9.407 ± 0.201 | 10.812 ± 0.242 | 8.992 ± 0.201 | 11.946 ± 0.255 | 13.722 ± 0.240 |
| 20 | 20 | 0 | 0.5 | 10.932 ± 0.208 | 10.856 ± 0.215 | 8.884 ± 0.150 | 11.635 ± 0.227 | 14.021 ± 0.249 |
| 20 | 60 | 0.9 | 0.1 | 3.343 ± 0.402 | 10.709 ± 0.302 | 10.378 ± 0.263 | 15.723 ± 0.368 | 41.525 ± 0.731 |
| 20 | 60 | 0.7 | 0.1 | 5.268 ± 0.200 | 11.001 ± 0.279 | 10.298 ± 0.262 | 15.181 ± 0.358 | 39.946 ± 0.568 |
| 20 | 60 | 0.5 | 0.1 | 7.987 ± 0.215 | 10.768 ± 0.277 | 10.484 ± 0.205 | 16.163 ± 0.276 | 41.285 ± 0.578 |
| 20 | 60 | 0 | 0.1 | 10.516 ± 0.203 | 10.732 ± 0.251 | 10.396 ± 0.173 | 15.802 ± 0.290 | 40.991 ± 0.619 |
| 60 | 20 | 0.9 | 0.1 | 3.059 ± 0.276 | 13.365 ± 0.556 | 17.720 ± 0.796 | 19.209 ± 0.789 | NA |
| 60 | 20 | 0.7 | 0.1 | 7.552 ± 0.405 | 14.151 ± 0.457 | 19.222 ± 0.782 | 20.752 ± 0.769 | NA |
| 60 | 20 | 0.5 | 0.1 | 10.619 ± 0.407 | 12.853 ± 0.370 | 17.965 ± 0.681 | 19.623 ± 0.668 | NA |
| 60 | 20 | 0 | 0.1 | 13.581 ± 0.450 | 12.8686 ± 0.470 | 18.661 ± 0.899 | 20.590 ± 0.888 | NA |

Experiment 2: Grouping structure among the features, response groups of size one. The goal of this experiment was to evaluate the method in the case where the response groups are still of size one, but where a grouping structure exists among the features. A model with 3rd order polynomial expansion: $Y = XA_1 + X^2A_2 + X^3A_3 + E$, was considered, with with feature groups set to be the individual variables and C estimated from univariate OMP fits (denoted as "M-OMP (C)"); (iv) G-OMP with individual and joint iteration number selection; and (v) OMP with individual and joint iteration number selection. The results are presented in Table 2 below.

TABLE 2

Average $F_1$ score (top) and average test set squared error (bottom) for the models output by variants of MG-OMP, Group-OMP and OMP under the setting of Experiment 2.

| ρ | MG-OMP (C) | MG-OMP (Id) | M-OMP (C) | G-OMP (ind) | G-OMP (joint) | OMP (ind) (g F1) | OMP (joint) (g F1) |
|---|---|---|---|---|---|---|---|
| 0.9 | 0.949 ± 0.006 | 0.903 ± 0.006 | 0.723 ± 0.007 | 0.892 ± 0.005 | 0.710 ± 0.011 | 0.595 ± 0.005 | 0.476 ± 0.012 |
| 0.7 | 0.931 ± 0.009 | 0.895 ± 0.007 | 0.723 ± 0.006 | 0.873 ± 0.007 | 0.686 ± 0.011 | 0.594 ± 0.005 | 0.492 ± 0.013 |
| 0.5 | 0.943 ± 0.004 | 0.886 ± 0.007 | 0.726 ± 0.009 | 0.873 ± 0.007 | 0.688 ± 0.013 | 0.596 ± 0.005 | 0.516 ± 0.015 |
| 0 | 0.928 ± 0.008 | 0.803 ± 0.006 | 0.675 ± 0.013 | 0.890 ± 0.006 | 0.722 ± 0.009 | 0.594 ± 0.005 | 0.503 ± 0.013 |

TABLE 2-continued

Average $F_1$ score (top) and average test set squared error (bottom) for the models
output by variants of MG-OMP, Group-OMP and OMP under the setting of Experiment 2.

| ρ | MG-OMP (C) | MG-OMP (Id) | M-OMP (C) | G-OMP (ind) | G-OMP (joint) | OMP (ind) (g F1) | OMP (joint) (g F1) |
|---|---|---|---|---|---|---|---|
| 0.9 | 1.217 ± 0.063 | 1.654 ± 0.075 | 4.312 ± 0.406 | 1.793 ± 0.082 | 3.185 ± 0.171 | 3.486 ± 0.232 | 5.001 ± 0.335 |
| 0.7 | 1.672 ± 0.169 | 1.797 ± 0.131 | 4.958 ± 0.344 | 1.803 ± 0.066 | 3.439 ± 0.208 | 3.224 ± 0.169 | 4.693 ± 0.235 |
| 0.5 | 1.728 ± 0.089 | 1.801 ± 0.092 | 4.881 ± 0.340 | 1.858 ± 0.081 | 3.393 ± 0.225 | 3.379 ± 0.184 | 4.864 ± 0.262 |
| 0 | 2.092 ± 0.142 | 1.080 ± 0.132 | 4.453 ± 0.229 | 1.764 ± 0.064 | 3.252 ± 0.176 | 3.591 ± 0.196 | 5.179 ± 0.278 |

Experiment 3: Grouping structure among features, a single response group. The goal of this experiment was to evaluate our method in the case where all the responses are grouped into a single group (i.e. simultaneous selection is desired across all the regressions). The model was the same as in Experiment 2, except for the sparsity pattern, which was row-wise as follows. $A_1$, $A_2$, $A_3$ have the same sparsity pattern, which is set by setting each row of the concatenated matrix $[A_1, A_2, A_3]$ to be zero or non-zero according to Bernoulli draws with success probability $P_r=0.2$. Then for each non-zero entry, independently, its value was set according to $N(0,1)$. The number of features for X, i.e., p, was set to 20, hence 60 variables grouped into 20 groups corresponding the 3rd degree polynomial expansion were considered.

MG-OMP was compared with correct feature groups and with feature groups set to be the individual variables, with C set to identity for both (note that in this special case using C estimated from univariate OMP fits has negligible impact on performance and is thus omitted for the sake of conciseness); G-OMP and OMP with individual and joint iteration number selection. The results are presented in Table 3 below.

A model with 3rd order polynomial expansion was considered: $[Y_{T1}, \ldots, Y_{TM}] = X[A_{1,T1}, \ldots, A_{1,TM}] + X^2[A_{2,T1}, \ldots A_{2,TM}] + X^3[A_{3,T1}, \ldots, A_{3,TM}] + E$, where the $T_k$'s are the target groups, X and E are generated according to the same distributions as in Experiment 2. For each k, each row of the concatenated matrix $[A_{1,T1}, \ldots, A_{3,TM}]$ was either all non-zero or all zero, according to Bernoulli draws with success probability $P_r=0.1$. Then for each non-zero entry of $A_{1,Tk}$, independently, its value was set according to $N(0,1)$. The number of features for X is set to 20, hence the experiment considered 60 variables grouped into 20 groups corresponding the 3rd degree polynomial expansion. The number of regressions was set to 60, with 20 regression groups $(T_1, \ldots, T_{20})$, each of size 3.

MG-OMP with correct feature and regression groups was compared, both for C estimated from univariate OMP fits and set to identity; running MG-OMP separately for each regression groups (denoted by "Parallel-MG-OMP"), namely, considering parallel runs, each with a single regression group, with C set to identity (Using C estimated from univariate OMP fits has negligible impact on

TABLE 3

Average $F_1$ score (top) and average test set squared error (bottom) for the models
output by variants of MG-OMP, Group-OMP mid OMP under the setting of Experiment 3.

| ρ | MG-OMP | M-OMP | G-OMP (ind) | G-OMP (joint) | OMP (ind) (g F1) | OMP (Joint) (g F1) |
|---|---|---|---|---|---|---|
| 0.9 | 0.971 ± 0.009 | 0.735 ± 0.021 | 0.896 ± 0.010 | 0.883 ± 0.014 | 0.599 ± 0.007 | 0.556 ± 0.012 |
| 0.7 | 0.998 ± 0.002 | 0.727 ± 0.020 | 0.890 ± 0.010 | 0.852 ± 0.015 | 0.603 ± 0.007 | 0.592 ± 0.011 |
| 0.5 | 0.981 ± 0.009 | 0.727 ± 0.022 | 0.908 ± 0.007 | 0.870 ± 0.013 | 0.605 ± 0.006 | 0.600 ± 0.015 |
| 0 | 0.998 ± 0.002 | 0.704 ± 0.023 | 0.900 ± 0.007 | 0.870 ± 0.012 | 0.587 ± 0.008 | 0.572 ± 0.014 |

| ρ | MG-OMP | M-OMP | G-OMP (ind) | G-OMP (joint) | OMP (ind) | OMP (joint) |
|---|---|---|---|---|---|---|
| 0.9 | 1.634 ± 0.058 | 4.323 ± 0.686 | 2.237 ± 0.181 | 3.310 ± 0.326 | 4.699 ± 0.495 | 6.901 ± 0.776 |
| 0.7 | 1.611 ± 0.071 | 3.165 ± 0.311 | 1.974 ± 0.122 | 3.294 ± 0.337 | 3.879 ± 0.300 | 5.211 ± 0.359 |
| 0.5 | 1.877 ± 0.169 | 3.056 ± 0.257 | 2.003 ± 0.092 | 2.930 ± 0.178 | 4.093 ± 0.293 | 5.526 ± 0.357 |
| 0 | 1.802 ± 0.137 | 4.972 ± 0.684 | 2.252 ± 0.221 | 3.398 ± 0.415 | 4.796 ± 0.395 | 6.634 ± 0.553 |

Experiment 4: Grouping structure among features and responses. The goal of this experiment was to evaluate the general setting for MG-OMP, where grouping structures exist among the features as well as among the targets.

performance, and hence is omitted for the sake of conciseness); G-OMP and OMP were with individual and joint iteration number selection. The results are presented in Table 4 below.

TABLE 4

Average $F_1$ score (top) and average test set squared error (bottom) for the models
output by variants of MG-OMP, Group-OMP and OMP under the setting of Experiment 4.

| ρ | MG-OMP (C) | MG-OMP (Id) | Parallel-MG-OMP | G-OMP (ind) | OMP (ind) |
|---|---|---|---|---|---|
| 0.9 | 0.863 ± 0.003 | 0.818 ± 0.003 | 0.762 ± 0.003 | 0.646 ± 0.007 | 0.517 ± 0.006 |
| 0.7 | 0.850 ± 0.002 | 0.806 ± 0.003 | 0.757 ± 0.003 | 0.631 ± 0.008 | 0.517 ± 0.007 |
| 0.5 | 0.850 ± 0.003 | 0.802 ± 0.004 | 0.766 ± 0.004 | 0.641 ± 0.006 | 0.525 ± 0.007 |
| 0 | 0.847 ± 0.004 | 0.848 ± 0.004 | 0.783 ± 0.004 | 0.651 ± 0.007 | 0.525 ± 0.007 |

TABLE 4-continued

Average $F_1$ score (top) and average test set squared error (bottom) for the models output by variants of MG-OMP, Group-OMP and OMP under the setting of Experiment 4.

| ρ | MG-OMP (C) | MG-OMP (Id) | Parallel-MG-OMP | G-OMP (ind) | OMP (ind) |
|---|---|---|---|---|---|
| 0.9 | 3.009 ± 0.234 | 3.324 ± 0.273 | 4.086 ± 0.169 | 6.165 ± 0.317 | 6.978 ± 0.206 |
| 0.7 | 3.114 ± 0.252 | 3.555 ± 0.287 | 4.461 ± 0.159 | 8.170 ± 0.328 | 8.14 ± 0.390 |
| 0.5 | 3.117 ± 0.234 | 3.630 ± 0.281 | 4.499 ± 0.288 | 7.305 ± 0.331 | 8.098 ± 0.323 |
| 0 | 3.124 ± 0.256 | 3.123 ± 0.262 | 3.852 ± 0.185 | 6.137 ± 0.330 | 7.414 ± 0.331 |

Overall, in all the settings with considered, MG-OMP was superior both in terms of prediction and variable selection accuracy, and more so when the correlation between responses increases. Note that even MG-OMP even with an imperfect estimate for C such as the identity was quite beneficial, and one of its merits came from the fact that model selection (i.e. namely stopping the procedure at a certain point) seemed to be more stable when stopping was performed once at a global level for all the regressions, rather than K times, once for each response.

Application to Vector Autoregressive Models and Causal Influence Detection

One area of application of MG-OMP is the area of causal influence detection, as disclosed in YOR920100188US1, incorporated by reference above. As discussed in that application, MG-OMP is one embodiment.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

From reading the present disclosure, other modifications will be apparent to persons skilled in the art. Such modifications may involve other features which are already known in the field and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Use of ordinal numbers, such as "first" or "second," is for distinguishing otherwise identical terminology, and is not intended to imply that operations or steps must occur in any particular order, unless otherwise indicated.

Where software or algorithms are disclosed, anthropomorphic or thought-like language may be used herein. There is, nevertheless, no intention to claim human thought or manual operations, unless otherwise indicated. All claimed operations are intended to be carried out automatically by hardware or software.

Where software or hardware is disclosed, it may be drawn with boxes in a drawing. These boxes may in some cases be conceptual. They are not intended to imply that functions described with respect to them could not be distributed to multiple operating entities; nor are they intended to imply that functions could not be combined into one module or entity unless otherwise indicated.

We claim:

1. A computer method comprising carrying out operations on at least one data processing device, the operations comprising:

maintaining a machine readable embodiment on a medium of data, the data being organized into at least one matrix data structure having a plurality of dimensions;

imposing a group structure on the data, which group structure defines input and output blocks, at least one of the input and output blocks encompassing at least first and second data points in each of at least first and second dimensions;

performing multivariate regression in accordance with a coefficient matrix that is organized into coefficient blocks, the coefficient blocks linking the input and output blocks, the multivariate regression comprising, iteratively refining the coefficient blocks and selecting pertinent ones of the input and output blocks, responsive to results of such iteration;

presenting at least one user accessible machine representation of at least one conclusion about at least one relationship between the pertinent ones of the input and output blocks, responsive to the coefficient matrix.

2. The method of claim 1, wherein refining coefficient blocks comprises imposing a sparsity structure on the coefficient matrix.

3. The method of claim 1, wherein input groups are groups of input features and output groups are groups of regressions.

4. The method of claim 1, wherein the data comprises results of activities of a set of originating community members; and an output of the regression indicates causal influence by at least one community member on another community member.

5. The method of claim 1, wherein the output comprises a ranking of community members.

6. The method of claim 1:

i) wherein refining comprises, not necessarily in the following order:

a) first selecting at least one of the input blocks
b) second selecting at least one of the output blocks; and
c) revising the first and second selecting to reduce residual loss; and ii) performing multivariate regression further comprises, for each iteration, calculating an updated residual loss responsive to a prior multivariate regression for the input and output blocks.

7. The method of claim 6, wherein minimizing residual loss comprises comparing results from more than one iteration.

8. The method of claim 6, wherein an arbitrary component regression method is allowed for performing the regression in each iteration.

9. The method of claim 6, wherein the operations further comprise taking into account additional information provided by an estimate of the error covariance matrix by incorporating this estimate into a loss function to be minimized.

10. The method of claim 1, wherein regression coefficients are re-estimated in each iteration.

11. A computer method comprising:

maintaining embodiments of at least first and second groups of content on a medium readable by the computer, such that each group is a representation of manifestations of activity of at least respective first and second originating community members;

performing spatiotemporal modeling with respect to all members of the first and second groups simultaneously;

wherein a group of regressions are modeled together, using a same set of input variable groups as predictors for the group of regressions, said modeling comprising:

jointly determining, for a whole regression group, whether to include or exclude input variable groups in a set of input variable groups, said joint determining including receiving information on a grouping structure between input variables and on a grouping structure between the regressions, and imposing, based on said information, a sparsity structure on estimated regression coefficients based on the grouping structure information to guide a variable selection;

determining an estimate of an error covariance matrix; and performing an iterative variable block selection comprising: selecting an input variable group of interest and a regression group of interest in each iteration for inclusion in said model based on an estimated reduction of residual loss in the model from said error matrix; and in subsequent iterations, selecting a variable block based on the estimated residual loss reduction of the model when the input variable group and corresponding regression group are included in the model in addition to those input variable and corresponding regression groups selected in earlier iterations, and inferring a relationship between the first and second community members responsive to the modeling.

12. A system comprising:

at least one storage device for embodying data and/or program code in a machine usable form;

at least one processor for performing operations in conjunction with the storage device, the operations comprising:

maintaining a machine readable embodiment on a medium of data, the data being organized into at least one matrix data structure having a plurality of dimensions;

imposing a group structure on the data, which group structure defines input and output blocks, at least one of the input and output blocks encompassing at least first and second data points in each of at least first and second dimensions;

performing multivariate regression in accordance with a coefficient matrix that is organized into coefficient blocks, the coefficient blocks linking the input and output blocks, the multivariate regression comprising, iteratively refining the coefficient blocks and selecting pertinent ones of the input and output blocks, responsive to results of such iteration;

presenting at least one user accessible machine representation of at least one conclusion about at least one relationship between the pertinent ones of the input and output blocks, responsive to the coefficient matrix.

13. The system of claim 12, wherein refining coefficient blocks comprises imposing a sparsity structure on the coefficient matrix.

14. The system of claim 12, wherein input groups are groups of input features and output groups are groups of regressions.

15. The system of claim 12, wherein the data comprises results of activities of a set of originating community members; and an output of the regression indicates causal influence by at least one community member on another community member.

16. The system of claim 12, wherein the output comprises a ranking of community members.

17. A computer program product for identifying influence, the computer program product comprising a non-transitory storage medium readable by a processing circuit and storing instructions to be run by the processing circuit for performing a method comprising
- maintaining a machine readable embodiment on a medium of data, the data being organized into at least one matrix data structure having a plurality of dimensions;
- imposing a group structure on the data, which group structure defines input and output blocks, at least one of the input and output blocks encompassing at least first and second data points in each of at least first and second dimensions;
- performing multivariate regression in accordance with a coefficient matrix that is organized into coefficient blocks, the coefficient blocks linking the input and output blocks, the multivariate regression comprising, iteratively
  - refining the coefficient blocks and
  - selecting pertinent ones of the input and output blocks, responsive to results of such iteration;
- presenting at least one user accessible machine representation of at least one conclusion about at least one relationship between the pertinent ones of the input and output blocks, responsive to the coefficient matrix.

18. The program product of claim 17, wherein refining coefficient blocks comprises imposing a sparsity structure on the coefficient matrix.

19. The program product of claim 17, wherein input groups are groups of input features and output groups are groups of regressions.

20. The program product of claim 17, wherein
- the data comprises results of activities of a set of originating community members; and
- an output of the regression indicates causal influence by at least one community member on another community member.

21. The program product of claim 17, wherein the output comprises a ranking of community members.

22. The program product of claim 17,
- i) wherein refining comprises, not necessarily in the following order:
  - a) first selecting at least one of the input blocks
  - b) second selecting at least one of the output blocks; and
  - c) revising the first and second selecting to reduce residual loss; and
- ii) performing multivariate regression further comprises, for each iteration, calculating an updated residual loss responsive to a prior multivariate regression for the input and output blocks.

23. The program product of claim 22, wherein minimizing residual loss comprises comparing results from more than one iteration.

24. The program product of claim 22, wherein an arbitrary component regression method is allowed for performing the regression in each iteration.

25. The program product of claim 22, wherein the operations further comprise taking into account additional information provided by an estimate of the error covariance matrix by incorporating this estimate into a loss function to be minimized.

* * * * *